(12) United States Patent
Warming

(10) Patent No.: US 12,721,251 B2
(45) Date of Patent: Sep. 1, 2026

(54) MOBILE FIELD ROBOT AND METHOD FOR STEERING A MOBILE FIELD ROBOT

(71) Applicant: FarmDroid ApS, Vejen (DK)

(72) Inventor: Jens Vest Warming, Rødding (DK)

(73) Assignee: FarmDroid ApS, Vejen (DK)

( * ) Notice: Subject to any disclaimer, the term of this patent is extended or adjusted under 35 U.S.C. 154(b) by 17 days.

(21) Appl. No.: 19/044,903

(22) Filed: Feb. 4, 2025

(65) Prior Publication Data

US 2025/0176453 A1 Jun. 5, 2025

Related U.S. Application Data

(63) Continuation of application No. PCT/DK2023/050192, filed on Jul. 26, 2023.

(30) Foreign Application Priority Data

Aug. 10, 2022 (DK) .......................... PA 2022 00746

(51) Int. Cl.
*A01B 69/00* (2006.01)
*A01B 69/04* (2006.01)
*B62D 6/00* (2006.01)

(52) U.S. Cl.
CPC ........... *A01B 69/008* (2013.01); *B62D 6/001* (2013.01)

(58) Field of Classification Search
None
See application file for complete search history.

(56) References Cited

U.S. PATENT DOCUMENTS

2008/0177442 A1* 7/2008 Tsukasaki ................ B62D 7/09 701/38
2008/0228353 A1 9/2008 Mayfield et al.
2009/0192691 A1 7/2009 O'Connor et al.
2011/0246041 A1* 10/2011 Kato ..................... B60T 8/1755 701/70
2013/0025957 A1 1/2013 Ellsworth
2013/0261898 A1* 10/2013 Fujita ..................... B62D 7/159 701/42
2015/0165856 A1 6/2015 Horstman
2022/0022359 A1* 1/2022 Warming ............ A01B 79/005

FOREIGN PATENT DOCUMENTS

DE 202014008067 U1 * 1/2016 ............ A01B 3/468
JP H11124051 A * 5/1999
KR 20180134493 A 12/2018

* cited by examiner

*Primary Examiner* — Shelley Chen
(74) *Attorney, Agent, or Firm* — Elevated IP, LLC

(57) ABSTRACT

A mobile field robot having a normal axis and configured to drive on the ground includes a frame, a first driving wheel that is driven by a first electrical motor and which is rotatably mounted to the frame or to a structure connected to the frame, a second driving wheel that is driven by a second electrical motor and which is rotatably mounted to the frame or to a structure connected to the frame, and a steerable wheel rotatably mounted to a wheel mount. The steerable wheel has a steerable wheel shaft axis, and is arranged and configured to be rotated in such a manner that the steerable wheel shaft axis is rotated about the normal axis. Further, a joint assembly is arranged and configured to rotate the steerable wheel in such a manner that the angle between the ground and the steerable wheel shaft axis is changed.

16 Claims, 8 Drawing Sheets

$$F_1L_1 = F_2L_2 \Rightarrow F_1 = F_2(L_2/L_1) = \tan^{-1}(29)\ F_2 = 1.54\ F_2$$

$$F_1L_1 = F_2L_2 \Rightarrow F_1 = F_2(L_2/L_1) = \tan^{-1}(29)\,F_2 = 1.54\,F_2$$

2

8
28
4
4'
2

4
4'
28
8
2
8
8'
28
4
4'

2
4
4'
28
8
8'

2
8
28
4
4'

2
4
4'
28
8
2
8
8'
28
4
4'
2
4
4'
28
8
8'

MOBILE FIELD ROBOT AND METHOD FOR STEERING A MOBILE FIELD ROBOT

CROSS-REFERENCE TO RELATED APPLICATIONS

This application is a continuation under 35 U.S.C. 111 of International Patent Application No. PCT/DK2023/050192, filed Jul. 26, 2023, which claims the benefit of and priority to Danish Application No. PA 2022 00746, filed Aug. 10, 2022, each of which is hereby incorporated by reference in its entirety.

FIELD OF INVENTION

The present invention relates to a mobile field robot having at least one steerable wheel and several driving wheels.

BACKGROUND

Due to the increasing salaries of workers and the high efficiency of mobile field robots, mobile field robots have recently been introduced in agriculture. Mobile field robots can be used for seeding and weeding.

Some mobile field robots comprise at least one single front mounted steerable wheel and two (or more) rear mounted driving wheels driven by one or more motors. When a mobile field robot is driving on a side slope, gravity will increase the torque on the motor of the driving wheel that is positioned at the lowest vertical position.

This undesired extra torque that is experienced when a mobile field robot is driving on a side slope wears out the motors. Moreover, since the motors must be capable of taking a large amount (e.g. up to 80%) of the total load, one has to install larger motors on the mobile field robot.

US2022022359A1 discloses a method for weeding between rows of crops with a weeding rod suspended from a vehicle part at a proximal portion of the weeding rod and left un-suspended at a distal portion thereof, the distal portion and the proximal portion in the same horizontal plane. Moreover a mobile field robot configured to drive on the ground is disclosed. The mobile field robot comprises a frame, two driving wheels that are driven by a motor and a steerable wheel mounted to a wheel mount, the steerable wheel having a steerable wheel shaft axis, wherein the steerable wheel is arranged and configured to be rotated in such a manner that the steerable wheel shaft axis is rotated about the normal axis of the mobile field robot. This mobile field robot is, however, not optimum for driving on a side slope.

US20130025957A1 discloses a zero turning radius vehicle having a power transmission operatively and independently engaged to each one of at least two driven wheels, and including at least one caster, supporting a portion of said vehicle weight, rotatably connected to the vehicle whereby the caster is operatively biased while the vehicle is operating at a side angle such that the caster neutralizes the gravitational force that would tend to drive the vehicle downward when traversing a slope. The vehicle comprises two spaced apart front mounted steering wheels. It would be an advantage to provide an alternative solution.

Accordingly, it would be desirable to be able to provide a mobile field robot:

a) in which the torques of the driving wheels are balanced out to a higher degree than in the prior art when the mobile field robot is driving on a side slope;

b) the overall efficiency of the mobile field robot can be improved because the one or more motors are driven in the range in which the efficiency is high; and c) the precision of the mobile field robot can be increased because the wheel spin is reduced due to the lower torque needed to be transferred from the wheel to the ground so that the effectiveness of correction of the wheel speed can be increased.

Thus, there is a need for a mobile field robot and method which reduces or even eliminates the above-mentioned disadvantages of the prior art.

BRIEF DESCRIPTION

It is an object to the present disclosure to provide a mobile field robot, in which the load of the one or more driving units (e.g. several motors) of the driving wheels and/or the torques of the driving wheels are balanced out to a higher degree than in the prior art.

A mobile field robot according to the present disclosure is a mobile field robot having a normal axis and being configured to drive on the ground, wherein the mobile field robot is an automated vehicle designed for agricultural crop production, wherein the mobile field robot comprises:

a frame;

a first driving wheel that is driven by a first motor, wherein the first driving wheel is mounted to the frame or to a structure connected to the frame;

a second driving wheel that is driven by the first motor or a second motor, wherein the second driving wheel is mounted to the frame or to a structure connected to the frame; and at least one steerable wheel mounted to a wheel mount, wherein the steerable wheel has a steerable wheel shaft axis, wherein the steerable wheel is arranged and configured to be rotated in such a manner that the steerable wheel shaft axis is rotated about the normal axis of the mobile field robot, wherein the mobile field robot:

a) is configured to detect one or more input of the load of the motor(s) and/or the slippage and/or road grip of one or more of the driving wheels and/or an inclination of the mobile field robot; and b) comprises a joint assembly arranged and configured to change the orientation of the steerable wheel on the basis of the input in such a manner that the difference between the load of the driving wheels is reduced.

Hereby, it is possible to reduce or even eliminate the above-mentioned disadvantages of the prior art.

It is possible to provide a mobile field robot, in which the torque of the driving wheels is balanced out to a higher degree than in the prior art when the mobile field robot is driving on a side slope.

Moreover, the overall efficiency of the mobile field robot can be improved because the one or more motors are driven in the range in which the efficiency is high.

Furthermore, the precision of the mobile field robot can be increased because the wheel spin is reduced due to the lower torque needed to be transferred from the wheel to the ground. Thereby increasing the effectiveness of correction of the wheel speed.

The mobile field robot according to the present disclosure is a mobile field robot configured to be used in agriculture handling tasks such as but not limited to seeding and weeding.

By the term mobile field robot is meant an automated vehicle designed for agricultural crop production.

The mobile field robot is configured to drive on the ground. The mobile field robot has a normal axis. The normal axis of the mobile field robot extends perpendicular to the ground. Accordingly, the normal axis of the mobile field robot extends vertically, when the mobile field robot is driving on horizontal ground.

The frame will typically comprise a number of rods and/or plates attached to constitute a basis for attachment of various structure of the mobile field robot. The frame may comprise several interconnected elements.

By the term "wheel" is meant a wheel or a continuous track, wherein the wheel or continuous track is arranged and configured to be ground engaging. The wheel or continuous track is arranged and configured to constitute the ground engaging portion of the propulsion system of the mobile field robot.

The first driving wheel is driven by a first motor and the first driving wheel is mounted to the frame or to a structure connected to the frame.

The second driving wheel is driven by the first motor or a second motor and the second driving wheel is mounted to the frame or to a structure connected to the frame.

In an embodiment, the one or more motors are electrical.

In an embodiment, the one or more motors are combustion engines.

In an embodiment, the mobile field robot comprises a single steerable wheel only, wherein the steerable wheel is mounted to a wheel mount, wherein the steerable wheel has a steerable wheel shaft axis.

In an embodiment, a single steerable wheel is arranged along the longitudinal axis of the mobile robot.

By the term "steerable wheel" is meant that the orientation of the steerable wheel relative to the frame of the mobile field robot can be changed.

In an embodiment, the steerable wheel is arranged and configured to be rotated in such a manner that the steerable wheel shaft axis is rotated about the normal axis of the mobile field robot.

The mobile field robot is configured to detect one or more input of the load of the motor(s) and/or the slippage and/or road grip of one or more of the driving wheels and/or an inclination of the mobile field robot.

By the term load is meant the current and/or the power and/or torque.

In an embodiment, the mobile field robot is configured to detect one or more input of the load of the motor(s).

In an embodiment, the mobile field robot is configured to detect one or more input of the slippage and/or road grip of one or more of the driving wheels.

In an embodiment, the mobile field robot is configured to detect one or more input of the inclination of the mobile field robot.

In an embodiment, the mobile field robot is configured to detect one or more input of the inclination of the lateral axis of the mobile field robot relative to horizontal.

The mobile field robot comprises a joint assembly arranged and configured to change the orientation of the steerable wheel on the basis of (in dependency of) the input in such a manner that the difference between the load of the driving wheels is reduced.

In an embodiment, the mobile field robot comprises a joint assembly arranged and configured to rotate the steerable wheel in such a manner that the angle between the ground and the steerable wheel shaft axis is changed. Hereby, the steerable wheel shaft axis is not restricted to extend parallel to the ground (as in the prior art).

In an embodiment, the mobile field robot comprises an electrical actuator arranged and configured to rotate the steerable wheel in such a manner that the angle between the ground and the steerable wheel shaft axis is changed.

Hereby, it is possible to control and hereby steer the steerable wheel in a fast, safe, reliable and accurate manner.

In an embodiment, the actuator is fixed to a base structure that is attached to the frame or a structure that is fixed to the frame. Hereby, it is possible to provide a firm and reliable attachment of the actuator.

In an embodiment, the actuator is fixed to the frame.

In an embodiment, the mobile field robot comprises a pneumatic actuator arranged and configured to rotate the steerable wheel in such a manner that the angle between the ground and the steerable wheel shaft axis is changed.

In an embodiment, the mobile field robot comprises a hydraulic actuator arranged and configured to rotate the steerable wheel in such a manner that the angle between the ground and the steerable wheel shaft axis is changed.

In an embodiment, the actuator is a motor.

In an embodiment, the wheel mount is rotatably mounted to a connector that is rotatably mounted to the base structure. Hereby, it is possible to allow the steerable wheel to be rotated in such a manner that the steerable wheel shaft axis is rotated about the normal axis of the mobile field robot.

In an embodiment, the joint assembly comprises a bracket that is attached to the base structure, wherein the connector is attached to a joint structure, wherein the bracket comprises two (typically parallel) end portions that are rotatably attached to the connector, for example, by one or more bolts. Hereby, it is possible to provide a reliable, robust and compact joint assembly.

In an embodiment, the joint structure is rotatably attached to a bracket that is fixed to a proximal structure and thus connected to the base structure via the proximal structure.

In an embodiment, the joint structure is angled 0-45 degrees relative to the normal axis. Hereby, it is possible to provide a practical and compact solution. In an embodiment, the joint structure is angled 10-40 degrees relative to the normal axis.

In an embodiment, the mobile field robot comprises a safety wire extending between pulleys each attached to different spaced apart arms, wherein the safety wire is mechanically connected to a safety device that is configured to stop the mobile field robot if the tension in the safety wire exceeds a predefined level. Hereby, it is possible to provide a safe mobile field robot.

The tension in the safety wire may exceed the predefined level if an object is brought into contact with the safety wire.

In an embodiment, the mobile field robot comprises a control system configured to detect the actual load of each of the motors of the driving wheels, wherein the control system is configured to activate the actuator when the control system detects that the difference between the load of the motor of the first driving wheel and the load of the motor of the second driving wheel exceeds a predefined level $C_1$.

In an embodiment, the mobile field robot comprises a control system configured to detect the slippage and/or road grip of the driving wheels, wherein the control system is configured to activate the actuator when the control system detects that the slippage and/or road grip of the driving wheels exceeds a predefined level.

In an embodiment, the mobile field robot comprises a control system configured to detect an inclination of the mobile field robot, wherein the control system is configured to activate the actuator when the control system detects that the inclination of the mobile field robot exceeds a predefined level.

$C_1$ can be zero or more. $C_1$ can vary in dependency of one or more parameters that can be detected by the mobile field robot.

In an embodiment, the load on the motors is balanced out in a manner in which the motor that is located in the lowest vertical position is loaded more than the other motor.

In an embodiment, the load on the motors is balanced out in a manner in which the motor that is located in the lowest vertical position is loaded 2-20% more than the other motor.

In an embodiment, the load on the motors is balanced out in a manner in which the motor that is located in the lowest vertical position is loaded 5-15% more than the other motor.

In an embodiment, the load on the motors is balanced out in a manner in which the motor that drives the driving wheel that is located in the lowest vertical position is loaded more than the other motor (that drives the driving wheel that is located in the highest vertical position), wherein the difference of the load of the two motors is selected in dependency of the side slope in such a manner that the difference of the load of the two motors is larger when the side slope is higher than when the side slope is lower.

Hereby, it is possible to provide a mobile field robot that can be controlled in an easy, save and efficient way.

In an embodiment, the control system is configured to:

a) activate the actuator in a first direction if $|B_1-B_2|\leq C_2$, where $C_2$ is a predefined level and $B_1$ is the load of the first motor and $B_2$ is the load of the second motor; and
b) activate the actuator in the opposite direction if $|B_2-B_1|\leq C_3$, where $C_3$ is a predefined level.

In an embodiment, the control system is configured to:

a) activate the actuator in a first direction if $|I_1-I_2|\leq C_2$, where $C_2$ is a predefined level and $I_1$ is the current of the first motor and $I_2$ is the current of the second motor; and
b) activate the actuator in the opposite direction if $|I_2-I_1|\leq C_3$, where $C_3$ is a predefined level.

$C_3$ can be a variable. $C_3$ can be a constant. $C_3$ can be zero or more.

The mobile field robot is capable of compensating for the uneven load that the motors of the driving wheels experience when the mobile field robot is driving on a side slope, gravity will increase the load on the motor of the driving wheel that is positioned in the lowest vertical position.

The object of the present disclosure can be achieved by a method for steering a mobile field robot having a normal axis and being configured to drive on the ground, wherein the mobile field robot is an automated vehicle designed for agricultural crop production, wherein the mobile field robot comprises:

a frame;
a first driving wheel that is driven by a first electrical motor, wherein the first driving wheel is mounted to the frame or to a structure connected to the frame;
a second driving wheel that is driven by a second electrical motor, wherein the second driving wheel is mounted to the frame or to a structure connected to the frame; and
a single steerable wheel rotatably mounted to a wheel mount, wherein the steerable wheel has a steerable wheel shaft axis, wherein the steerable wheel is arranged and configured to be rotated in such a manner that the steerable wheel shaft axis is rotated about the normal axis of the mobile field robot, wherein the method comprises the step of:

detecting one or more input of the load of the motor(s) and/or the slippage and/or road grip of one or more of the driving wheels and/or an inclination of the mobile field robot; and
wherein the mobile field robot further comprises a joint assembly arranged and configured to change the orientation of the steerable wheel on the basis of the input in such a manner that the difference between the load of the driving wheels is reduced.

Hereby, it is possible to reduce or even eliminate the above-mentioned disadvantages of the prior art.

It is possible to provide a method, by which the individual motors of the driving wheels are balanced out to a higher degree than in the prior art.

Moreover, the method enables the overall efficiency of the mobile field robot to be improved because both motors are driven in the range in which the efficiency is high.

In an embodiment, the method comprises the step of detecting one or more inputs of the load of the motor(s).

In an embodiment, the method comprises the step of detecting one or more inputs of the slippage and/or road grip of one or more of the driving wheels.

In an embodiment, the method comprises the step of detecting one or more inputs of the inclination of the mobile field robot.

In an embodiment, the method comprises the step of detecting one or more inputs of the inclination of the lateral axis of the mobile field robot relative to horizontal.

In an embodiment, the method comprises the step of rotating the steerable wheel in such a manner that the angle between the ground and the steerable wheel shaft axis is changed in such a manner that the difference between the load of the driving wheels is reduced.

In an embodiment, the method comprises the step of rotating the steerable wheel shaft axis about the normal axis of the mobile field robot in such a manner that the difference between the load of the driving wheels is reduced.

In an embodiment, the method comprises the step of applying an actuator to rotate the steerable wheel in such a manner that the angle between the ground and the steerable wheel shaft axis is changed. By the term "actuator" is meant a motor designed for moving or controlling a mechanism or system. The actuator is driven by an energy source, usually in the form of electrical energy, hydraulic pressure difference or pneumatic pressure difference—and converts this energy into some kind of mechanical movement. Accordingly, the actuator can be an electrical actuator, a hydraulic actuator or a pneumatic actuator.

In an embodiment, the actuator is fixed to a base structure that is attached to the frame or a structure that is fixed to the frame.

In an embodiment, the wheel mount is rotatably mounted to a connector that is rotatably mounted to the base structure.

In an embodiment, the joint structure is angled 0-45 degrees relative to the normal axis.

In an embodiment, the joint structure is angled 10-40 degrees relative to the normal axis.

In an embodiment, the mobile field robot comprises a safety wire extending between pulleys each attached to different spaced apart arms, wherein the safety wire is mechanically connected to a safety device that is configured to stop the mobile field robot if the tension in the safety wire exceeds a predefined level.

In an embodiment, the method comprises the following steps:

a) detecting the actual load of each of the motors of the driving wheels and/or the slippage and/or road grip of the driving wheels; and b) activating the actuator if a difference between the load of the motor of the first driving wheel and the load of the motor of the second driving wheel or the slippage and/or road grip of the driving wheels exceeds a predefined level $C_1$.

In an embodiment, the method comprises the following steps:

a) activating the actuator in a first direction if $|B_1-B_2|C_2$, and b) activating the actuator in the opposite direction if $|B_2-B_1|\leq C_3$, where $C_3$ is a predefined level and where $C_2$ is a predefined level and $B_1$ is the load of the first motor and $B_2$ is the load of the second motor.

BRIEF DESCRIPTION OF THE DRAWINGS

The invention will become more fully understood from the detailed description given herein below. The accompanying drawings are given by way of illustration only, and thus, they are not limitative of the present invention. In the accompanying drawings.

DETAILED DESCRIPTION

Referring now in detail to the drawings for the purpose of illustrating embodiments of the present systems and methods.

Figure 1A:
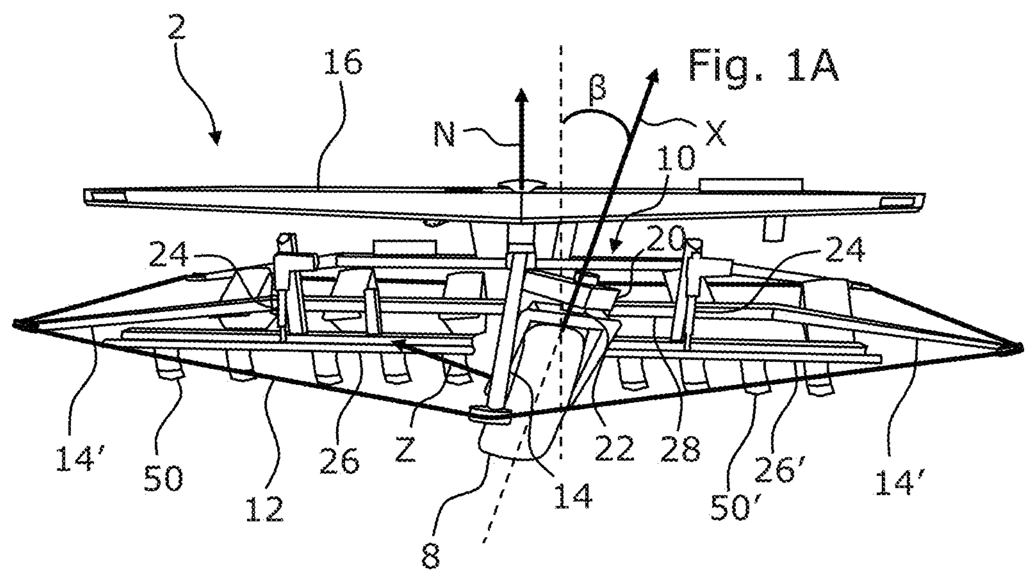
FIG. 1A shows a schematic front view of a mobile field robot according to an embodiment.

FIG. 1A illustrates a schematic front view of a mobile field robot 2 according to an embodiment. The mobile field robot 2 may be electrically driven and comprise two electrically driven driving wheels (not shown). The mobile field robot 2 may also be driven by a combustion motor. Each of the driving wheels is driven by an individual motor (not shown) or by a single motor. If the mobile field robot 2 is electrical, the mobile field robot 2 comprises one or more batteries (not shown) and a roof mounted solar panel 16 that is electrically connected to the electrical system of the mobile field robot 2. Accordingly, the solar panel 16 is configured to charge the one or more batteries of the mobile field robot 2.

The mobile field robot 2 comprises a frame 28. Various tools 50, 50' may be moveably attached to the frame 28 depending on the function and construction of the mobile field robot 2. The tools 50, 50' are mounted on two rods 26, 26'. Each rod 26, 26' is moveably mounted to the frame 28 by an electrical actuator 24. The actuator may alternatively be pneumatic or hydraulic. In an embodiment, each rod 26, 26' is mounted to the frame 28 by one or more joints for providing accuracy, stability and strength to resist the load expected during use of the tools 50, 50'.

The mobile field robot 2 comprises a connector 20 that is moveably attached to a base structure (see reference number 32 in FIG. 2) which is attached to the frame 28. The mobile field robot 2 comprises a steerable wheel 8 that is rotatably mounted to a wheel mount by a shaft (not shown). The wheel mount is rotatably mounted to the connector 20 by a shaft assembly 22. Accordingly, the steerable wheel 8 is a steerable wheel that can change its direction relative to the longitudinal axis of the mobile field robot 2.

The mobile field robot 2 comprises a joint assembly 10 that allows the steerable wheel 8 to rotate in such a manner that the longitudinal axis X of the steerable wheel 8 that extends in the same plane as the normal axis N of the mobile field robot 2 is angularly displaced relative to the normal axis N of the mobile field robot 2.

In FIG. 1 it can be seen that the angle β between the longitudinal axis X and the normal axis N of the mobile field robot 2 is about 20 degrees. Accordingly, the mobile field robot 2 is capable of compensating for the uneven load (e.g. torque) that the motors of the driving wheels experience when the mobile field robot is driving on a side slope, where gravity will increase the load on the motor of the driving wheel that is positioned in the lowest vertical position.

The steerable wheel shaft axis Z is shown in FIG. 1. The steerable wheel shaft axis Z is angled with approximately the same angle β relative to the ground as the longitudinal axis X is angled relative to the normal axis N of the mobile field robot 2. It is, however, possible to allow the wheel shaft axis Z to be angled slightly different relative to the ground as the longitudinal axis X than the angle β relative to the normal axis N of the mobile field robot 2. This may be an advantage if an over or under compensation of the angle makes it possible to balance out the torque of the driving wheels.

In an embodiment, power and/or current measurements of the one or more motors driving the driving wheels are used to control the angle of the one or more steerable wheels.

The mobile field robot 2 comprises a safety wire 12 extending between pulleys attached to arms 14, 14'. The safety wire 12 is mechanically connected to a safety device (not shown) that is configured to stop the mobile field robot 2 if the tension in the safety wire 12 exceeds a predefined level (e.g. if an object is brought into contact with the safety wire 12).

Figure 1B:
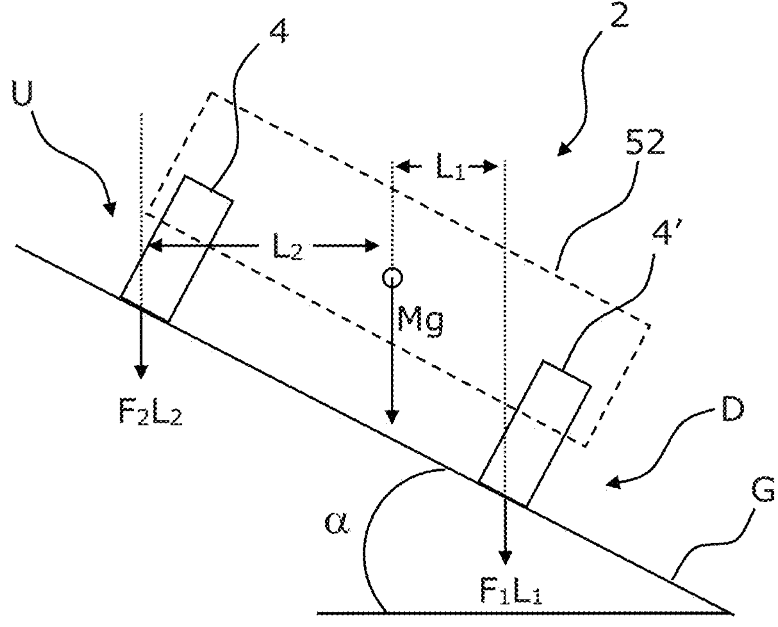
FIG. 1B shows a schematic rear view of a mobile field robot according to an embodiment.

FIG. 1B illustrates a schematic rear view of a mobile field robot 2 according to an embodiment. The mobile field robot 2 comprises two driving wheels 4, 4'. The mobile field robot 2 is driving on a side slope. Accordingly, the left driving wheel 4 is the uphill side U driving wheel 4, while the right driving wheel 4' is the downhill side D driving wheel 4'. The driving wheels 4, 4' are rotatably mounted to the mobile field robot body 52 (indicated by a dotted rectangle). The mobile field robot body 52 has a mass M that is exerted on the driving wheels 4, 4', and the center of gravity of the mobile field robot body 52 is indicated with a circle. The weight Mg (mass M times gravity g) is indicated with an arrow.

The slope or angle $\alpha$ of the ground G relative to horizontal is indicated. Due to the slope or angle $\alpha$, gravity g will increase the load on the motor of the downhill side D driving wheel 4' since it is positioned in a lower vertical position than the uphill side U driving wheel 4. Since the orientation of the mobile field robot 2 is maintained, the vertical forces $F_1$, $F_2$ exerted on the uphill side U driving wheel 4 and the downhill side D driving wheel 4', respectively, can be calculated in the following way when the horizontal distance $L_2$ between the center of gravity and the uphill side U driving wheel 4 and the horizontal distance $L_1$ between the center of gravity and the downhill side D driving wheel 4' are defined as indicated in FIG. 1:

$$F_1L_1=F_2L_2 \quad (1)$$

$$\Rightarrow F_1=F_2(L_2/L_1)=\tan^{-1}(\alpha)F_2 \quad (2)$$

When the angle $\alpha$ is 29 degrees it follows that:

$$F_1=\tan^{-1}(29)F_2=1.543F_2 \quad (3)$$

Accordingly, the vertical force $F_1$ exerted by the mobile field robot 2 on the downhill side D driving wheel 4' is 1.54 times the vertical force $F_2$ exerted by the mobile field robot 2 to the uphill side U driving wheel 4.

It has to be noted that the calculation is simplified because the position and orientation of the steerable wheel (see FIG. 1A, FIG. 2 or FIG. 3) may have an impact on the exact vertical load exerted on the driving wheels 4, 4'.

Figure 2:
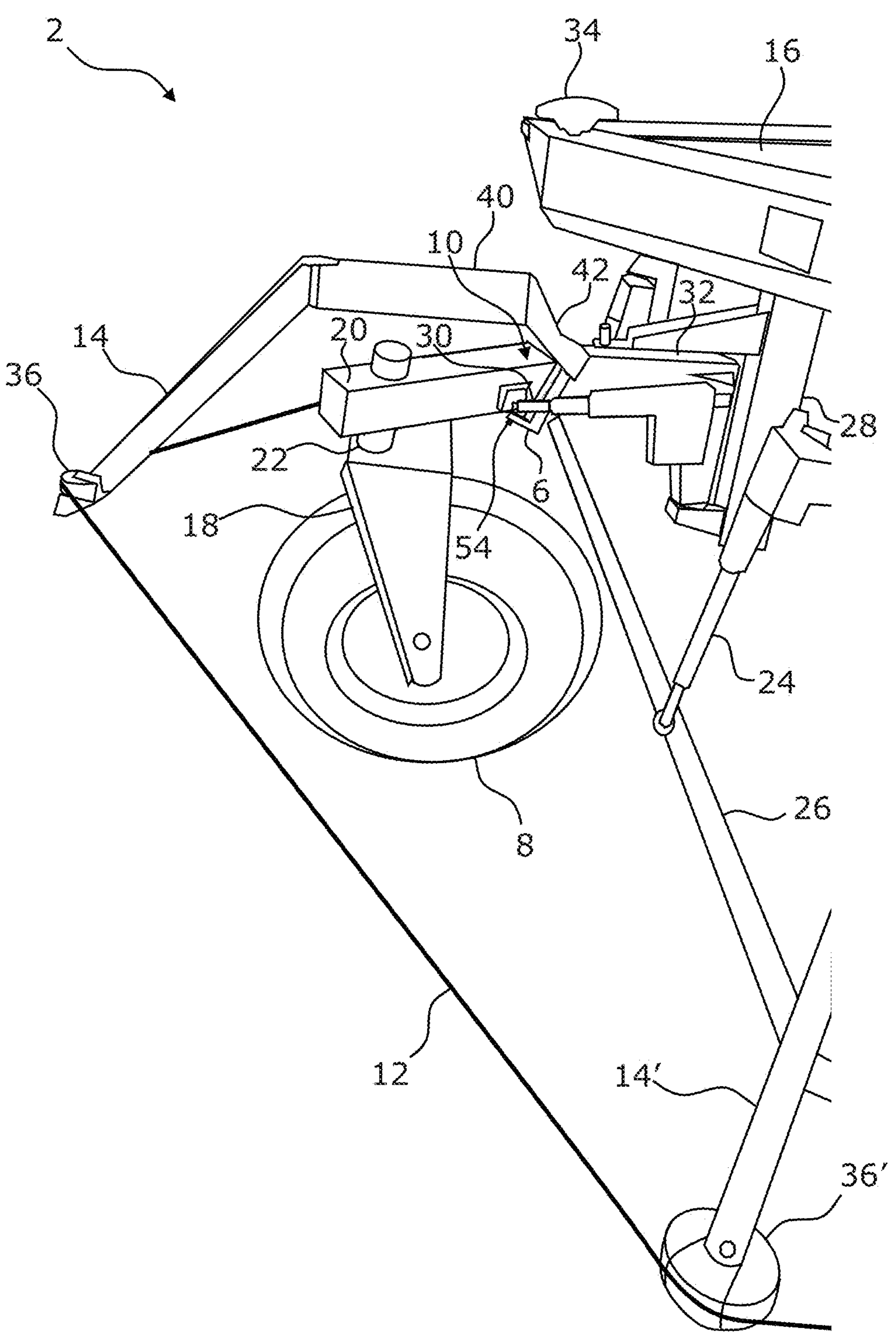
FIG. 2 shows a schematic, perspective side view of the front portion of a mobile field robot according to an embodiment.
Figure 3:
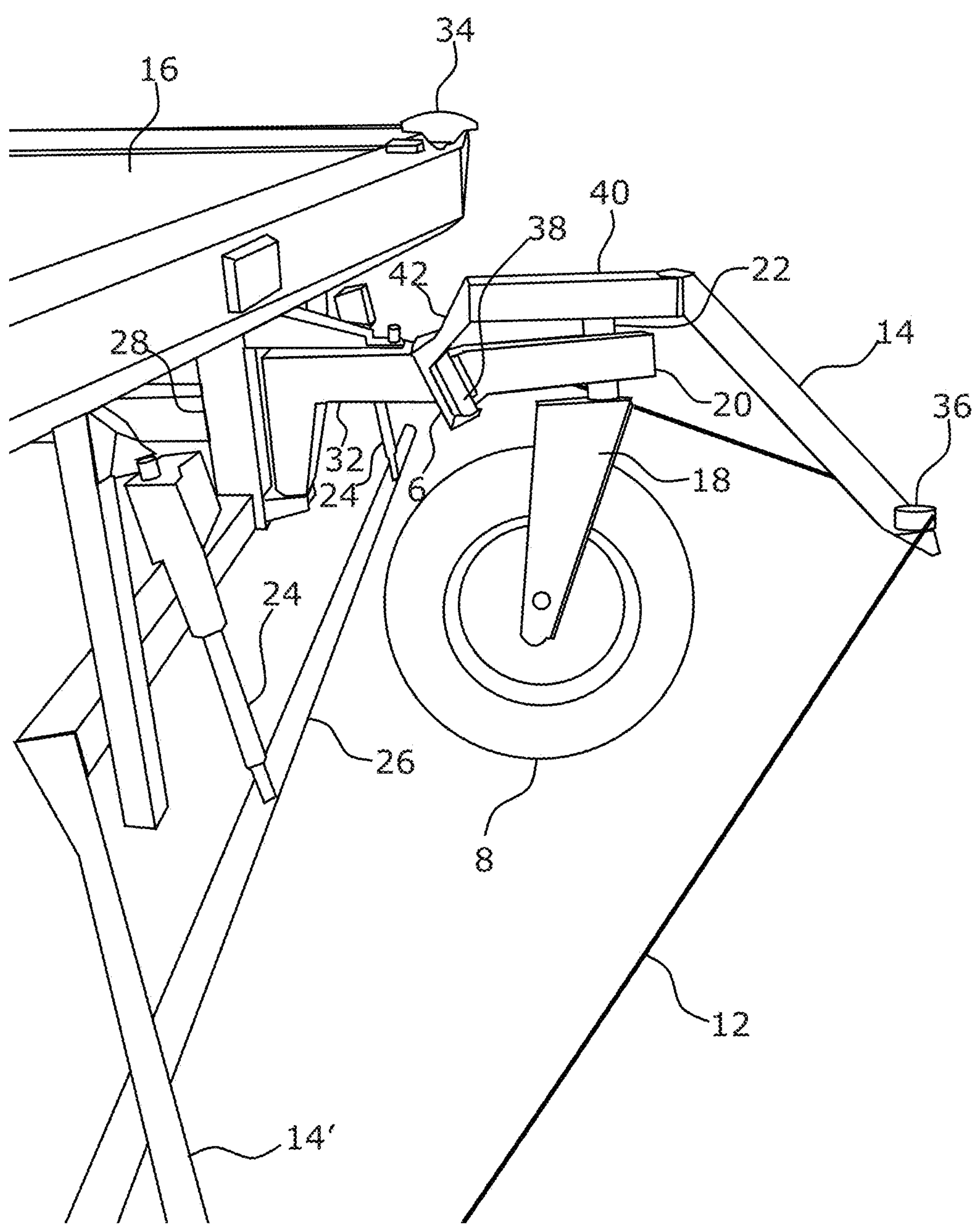
FIG. 3 shows another schematic, perspective side view of the front portion of the mobile field robot shown in FIG. 2.

FIG. 2 illustrates a schematic, perspective side view of the front portion of a mobile field robot 2 according to an embodiment. FIG. 3 illustrates another schematic, perspective side view of the front portion of the mobile field robot 2 shown in FIG. 2. The mobile field robot 2 basically corresponds to the one shown in FIG. 1A. The mobile field robot 2 comprises a frame 28.

The mobile field robot 2 comprises a connector 20 that is moveably attached to a base structure 32 that is fixed to the frame 28. The mobile field robot 2 comprises a steerable wheel 8 that is rotatably mounted to a wheel mount 18 by a shaft (not shown). The wheel mount 18 is rotatably mounted to the connector 20 by a shaft assembly 22. Thus, the steerable wheel 8 is a steerable wheel that can change its direction relative to the longitudinal axis of the mobile field robot 2.

The mobile field robot 2 comprises a joint assembly 10 arranged and configured to bring the steerable wheel 8 into a position, in which the longitudinal axis of the steerable wheel 8 that extends in the same plane as the normal axis of the mobile field robot 2 is angularly displaced relative to the normal axis of the mobile field robot 2. The joint assembly 10 comprises a bracket 6 that is attached to the base structure 32. The bracket 6 comprises two (typically parallel) end portions that are rotatably attached to the connector 20 (e.g. by one or more bolts 54).

An electrical actuator 30 is arranged to rotate the connector 20 relative to the base structure 32. The proximal end of the electrical actuator 30 is attached to the base structure 32. The distal (moveable) portion of the electrical actuator 30 is attached to the connector 20. Accordingly, when the electrical actuator 30 is activated and the length of the electrical actuator 30 is changed, this causes the connector 20 to rotate relative to the base structure 32. Accordingly, the actuator 30 is configured to bring the steerable wheel 8 into a position, in which the longitudinal axis of the steerable wheel 8 that extends in the same plane as the normal axis of the mobile field robot 2 is angularly displaced relative to the normal axis of the mobile field robot 2.

The mobile field robot 2 generally comprises a control system. In an embodiment, the control system is configured to detect the actual load (e.g. the current $I_1$, $I_2$ and/or power $P_1$, $P_2$) of each of the motors of the driving wheels 4, 4'. In an embodiment, the control system is configured to activate the actuator 30 when it is detected that the difference between the current $I_1$ of the motor of the first driving wheel 4 and the current $I_2$ of the motor of the second driving wheel 4' exceeds a predefined level $C_1$.

In an embodiment, the control system is configured to activate the actuator 30 in a first direction if:

$$|I_1-I_2|\leq C_2, \text{ where } C_2 \text{ is a predefined level.} \quad (4)$$

In an embodiment, the control system is configured to activate the actuator 30 in the opposite direction if:

$$|I_2-I_1|\leq C_3, \text{ where } C_3 \text{ is a predefined level.}$$

Instead of detecting the current of power of the motors, it is alternatively possible to detect the speed (revolutions per minute, RMP) of the motors. If the motor of the first driving wheel 4 has the speed $\omega_1$ and the motor of the second driving wheel 4' has the speed $\omega_2$, the control system may be configured to activate the actuator 30 in a first direction if:

$$|\omega_1-\omega_2|\leq C_4, \text{ where } C_4 \text{ is a predefined level.} \quad (6)$$

In an embodiment, the control system is configured to activate the actuator 30 in the opposite direction if:

$$|\omega_2-\omega_1|\leq C_5, \text{ where } C_5 \text{ is a predefined level.(} \quad 7)$$

In an embodiment, the mobile field robot 2 comprises an inclination sensor arranged to detect an angle of the frame. In an embodiment, the inclination sensor is arranged to detect an angle of a lateral axis of the frame.

In an embodiment, the control system is configured to activate the actuator 30 based on signals from an inclination sensor built into the mobile field robot 2 in such a manner that the steerable wheel(s) will always remain at an angle that is perpendicular to gravity.

The mobile field robot 2 is capable of compensating for the uneven load that the motors of the driving wheels 4, 4' experience when the mobile field robot 2 is driving on a side slope, where gravity will increase the load on the motor of the driving wheel that is positioned in the lowest vertical position.

The mobile field robot 2 comprises a safety wire 12 extending between pulleys 36, 36' provided in the distal end of arms 14, 14'. The safety wire 12 is connected to a safety device (not shown) that is configured to stop the mobile field robot 2 if the tension in the safety wire 12 exceeds a predefined level (e.g. if an object is brought into contact with the safety wire 12). One of the arms 14 is attached to a connection structure 40 that extends between the arm 14 and a proximal structure 42 that is attached to the base structure 32.

In an embodiment, the bracket 6 is connected to the proximal structure 42. Since the proximal structure 42 is attached to the base structure 32, the bracket 6 is connected to the base structure 32 via the proximal structure 42.

The mobile field robot 2 comprises a solar panel 16 and an antenna 34 arranged at the side portion of the solar panel 16.

The mobile field robot 2 comprises one or more rods 26 that are moveably mounted by one or more electrical actuators 24. Various tools (not shown) may be attached to the rods 26. Accordingly, the rods 24 and thus the tools can be lowered in order to make the tools (e.g. weeding tools) engage with the ground and be raised in order to bring the tools out of engagement with the ground.

Figures 4A, 4B:
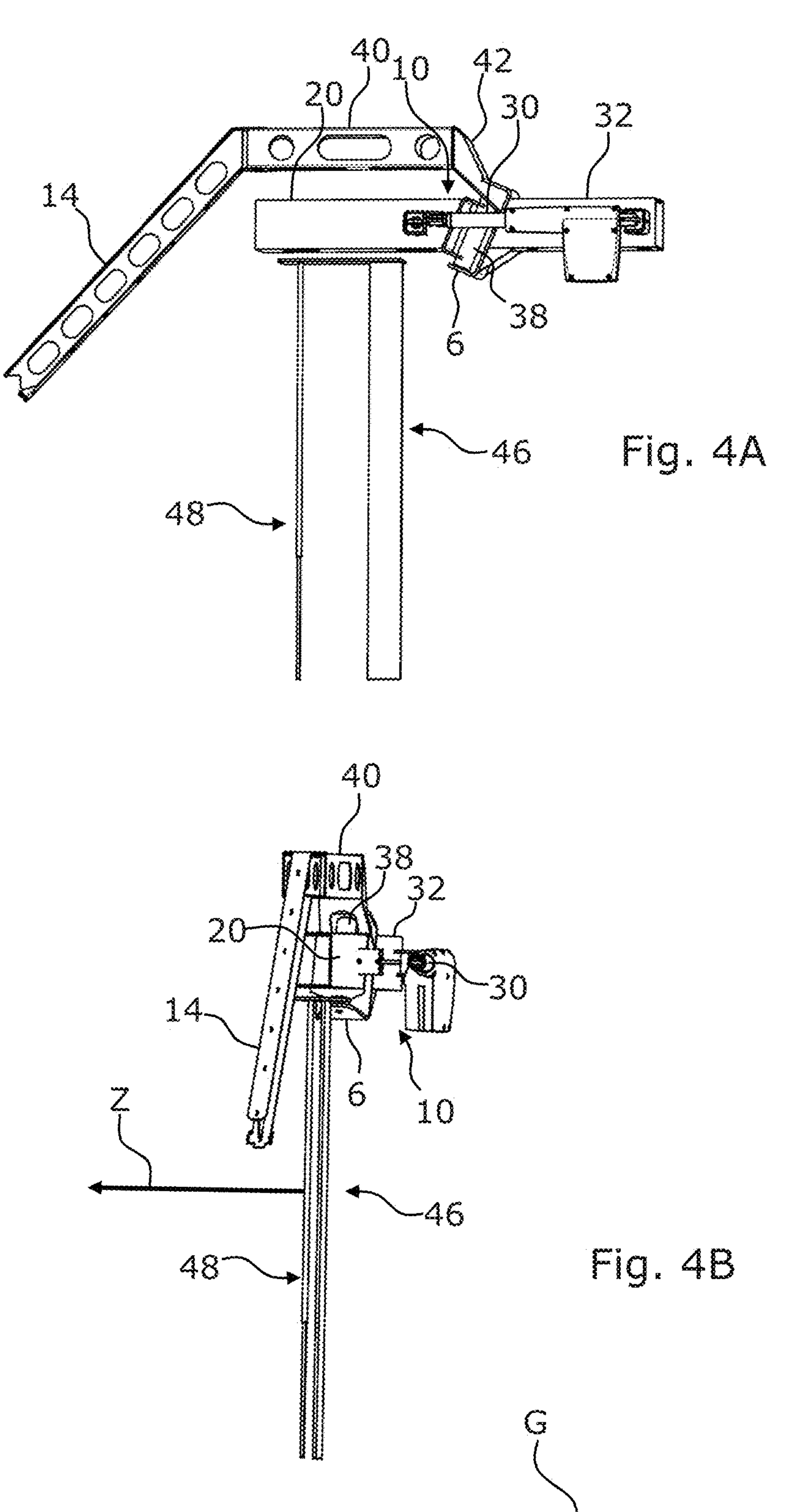
FIG. 4A shows a side view of the components of a joint assembly of a mobile field robot according to an embodiment.
FIG. 4B shows a perspective front view of the components of the joint assembly shown in FIG. 4A.

FIG. 4A illustrates a side view of the components of a joint assembly 10 of a mobile field robot according to an embodiment. FIG. 4B illustrates a perspective front view of the components of the joint assembly 10 shown in FIG. 4A. The joint assembly 10 comprises a bracket 6 that is fixed to the proximal structure 42.

The proximal structure 42 is attached to a base structure 32 that is designed to be attached to the frame or a structure connected to the frame of the mobile field robot. A connection structure 40 is attached to the proximal structure 42. The connection structure 40 extends between the proximal structure 42 and an arm 14.

A connector 20 is arranged below the connection structure 40. The free (distal) end of an electrical actuator 30 is attached to the connector 20. The proximal end of the electrical actuator 30 is attached to the base structure 32.

A cylindrical joint structure 38 is fixed to the connector 20. The joint structure 38 is rotatably attached to a bracket 6 that is fixed to the proximal structure 42 and thus connected to the base structure 32 via the proximal structure 42. Accordingly, when the electrical actuator 30 is activated and the length of the electrical actuator 30 changes, it will cause the connector 20 to move relative to the base structure 32. When the electrical actuator 30 is extended or shortened, the electrical actuator 30 will rotate the connector 20 about the longitudinal axis of the joint structure 38. Below the connector 20, a mounting structure 46 and a cable 48 is shown. The mounting structure 46 and the cable 48 are designed for mounting a steerable wheel (not shown). In FIG. 4A and FIG. 4. B, the steerable wheel (not shown) is arranged in a neutral position, in which steerable wheel shaft axis Z extends parallel with the ground G.

Figure 5A:
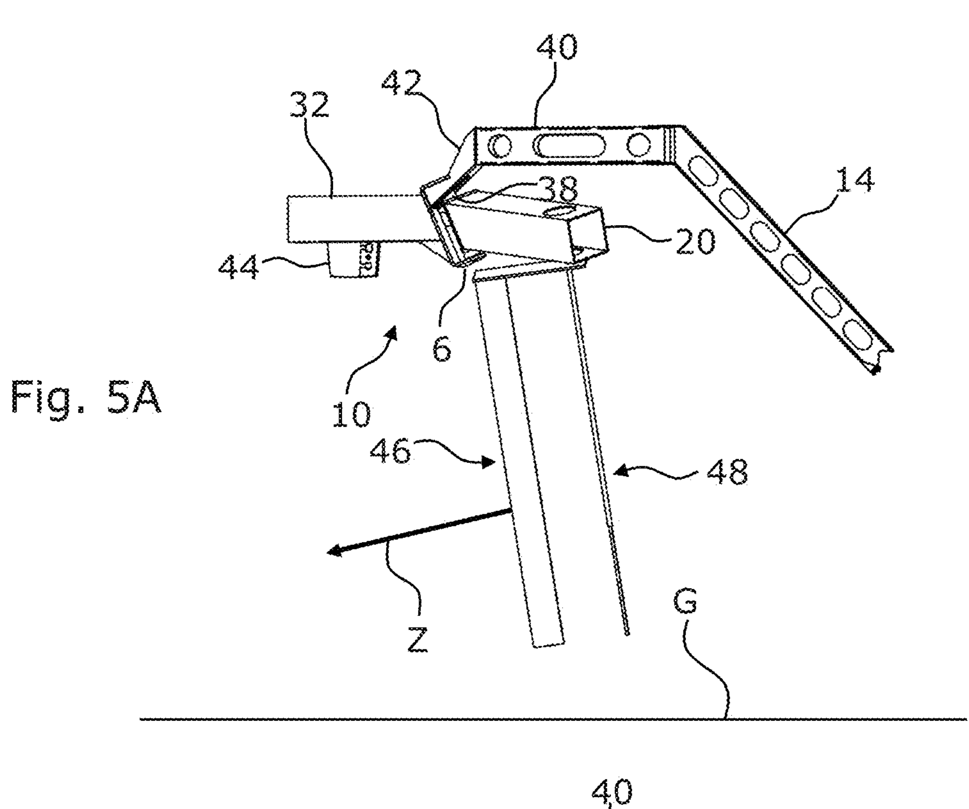
FIG. 5A shows a side view of the components of a joint assembly of a mobile field robot according to an embodiment.
Figure 5B:
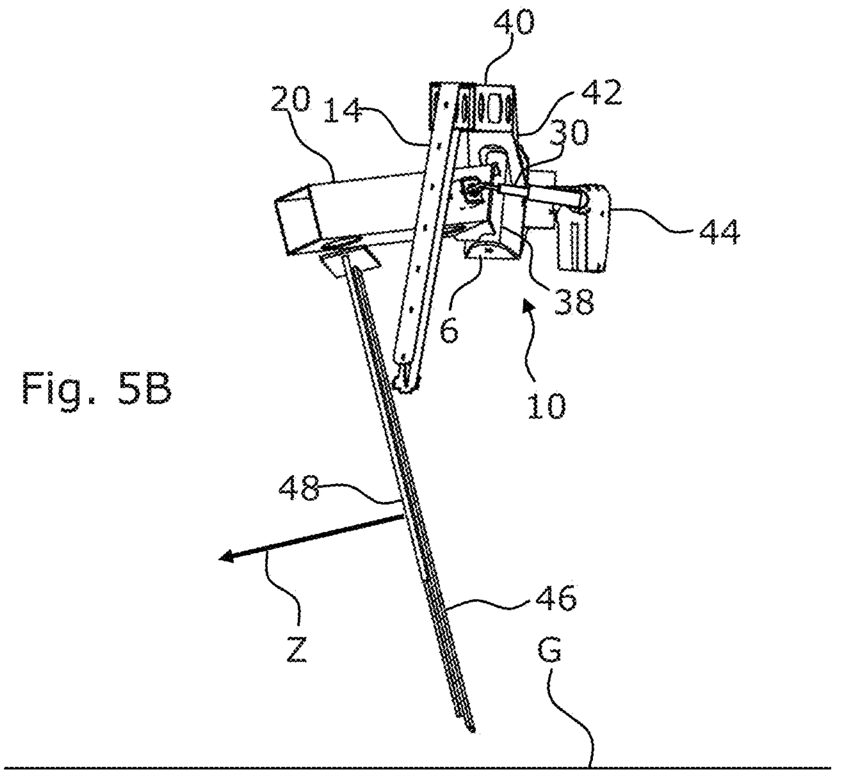
FIG. 5B shows a perspective front view of the components of the joint assembly shown in FIG. 5A.

FIG. 5A illustrates a side view of the components of the joint assembly 10 shown in FIG. 4A and in FIG. 4B. FIG. 5B illustrates a perspective front view of the components of the joint assembly 10 shown in FIG. 5A.

In FIG. 5A and FIG. 5B, however, the electrical actuator 30 has been extended. Accordingly, the steerable wheel (not shown) is arranged in an angled position, in which the steerable wheel shaft axis Z does not extend parallel with the ground G.

Figure 6A:
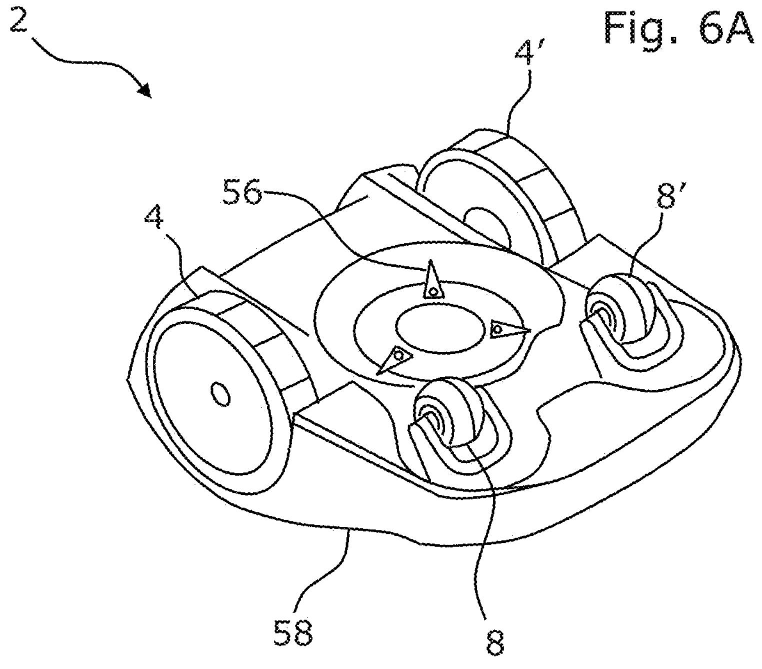
FIG. 6A shows a bottom view of a mobile field robot according to an embodiment.
Figure 6B:
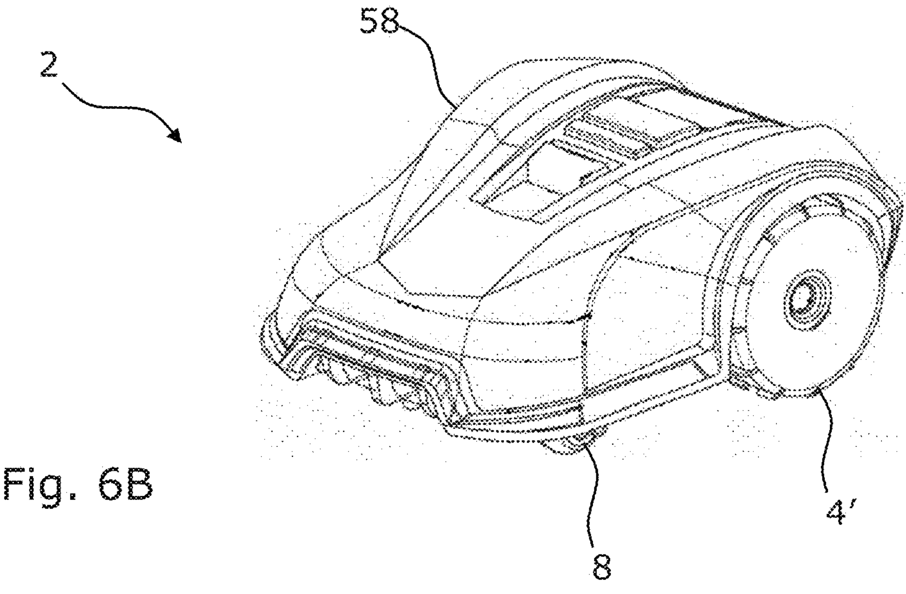
FIG. 6B shows a top view of a mobile field robot according to an embodiment.

FIG. 6A illustrates a bottom view of a mobile field robot 2 according to an embodiment, and FIG. 6B illustrates a top view of a mobile field robot according to an embodiment. The mobile field robot 2 is an autonomous lawnmower robot that comprises a housing 58 and two drive-free steerable wheels 8, 8' and two driving wheels 4, 4'. In an embodiment, the mobile field robot 2 comprises a single drive-free steerable wheel only.

The mobile field robot 2 comprises a cutting assembly equipped with several cutting knives 56. The cutting assembly is rotatably mounted to the housing 56.

The mobile field robot 2 comprises at least one sensor unit for identifying a movement of the steerable wheels relative to the housing 58.

Figures 7A, 7B, 7C, 7D:
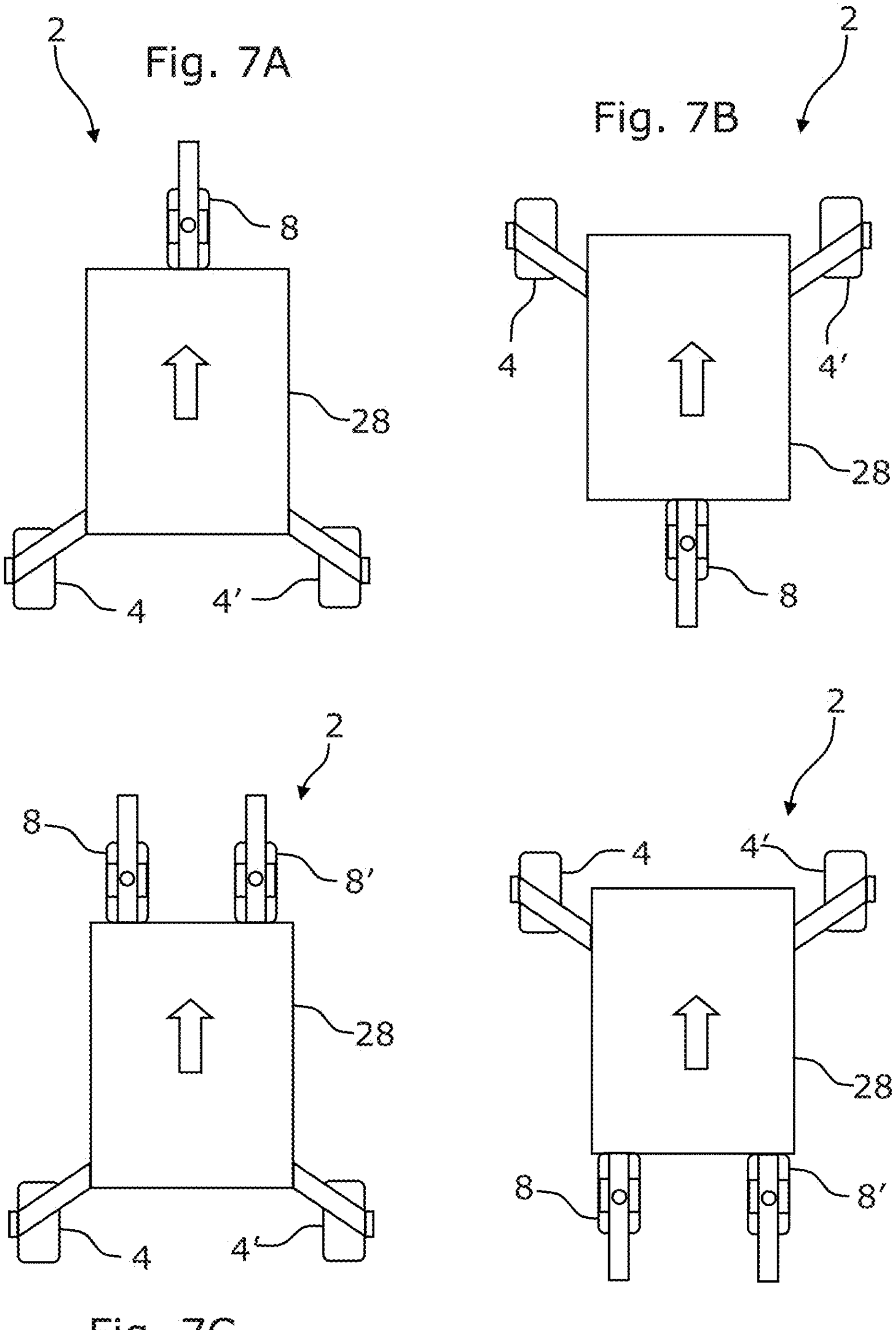
FIG. 7A shows a top view of a mobile field robot according to an embodiment.
FIG. 7B shows a top view of a mobile field robot according to an embodiment.
FIG. 7C shows a top view of a mobile field robot according to an embodiment.
FIG. 7D shows a top view of a mobile field robot according to an embodiment.

FIG. 7A illustrates a top view of a mobile field robot 2 according to an embodiment. The mobile field robot 2 comprises a frame 28 and a centrally arranged front mounted steerable wheel 8. The mobile field robot 2 comprises two rear mounted driving wheels 4, 4'. The forward driving direction of the mobile field robot 2 is indicated with an arrow.

FIG. 7B illustrates a top view of a mobile field robot 2 according to an embodiment. The mobile field robot 2 comprises a frame 28 and a centrally arranged rear mounted steerable wheel 8. The mobile field robot 2 comprises two front mounted driving wheels 4, 4'. The forward driving direction of the mobile field robot 2 is indicated with an arrow.

FIG. 7C illustrates a top view of a mobile field robot 2 according to an embodiment. The mobile field robot 2 comprises a frame 28 and two front mounted steerable wheels 8, 8'. The mobile field robot 2 comprises two rear mounted driving wheels 4, 4'. The forward driving direction of the mobile field robot 2 is indicated with an arrow.

FIG. 7D illustrates a top view of a mobile field robot 2 according to an embodiment. The mobile field robot 2 comprises a frame 28 and two rear mounted steerable wheels 8, 8'. The mobile field robot 2 comprises two front mounted driving wheels 4, 4'. The forward driving direction of the mobile field robot 2 is indicated with an arrow.

Figures 8A, 8B, 8C, 8D:
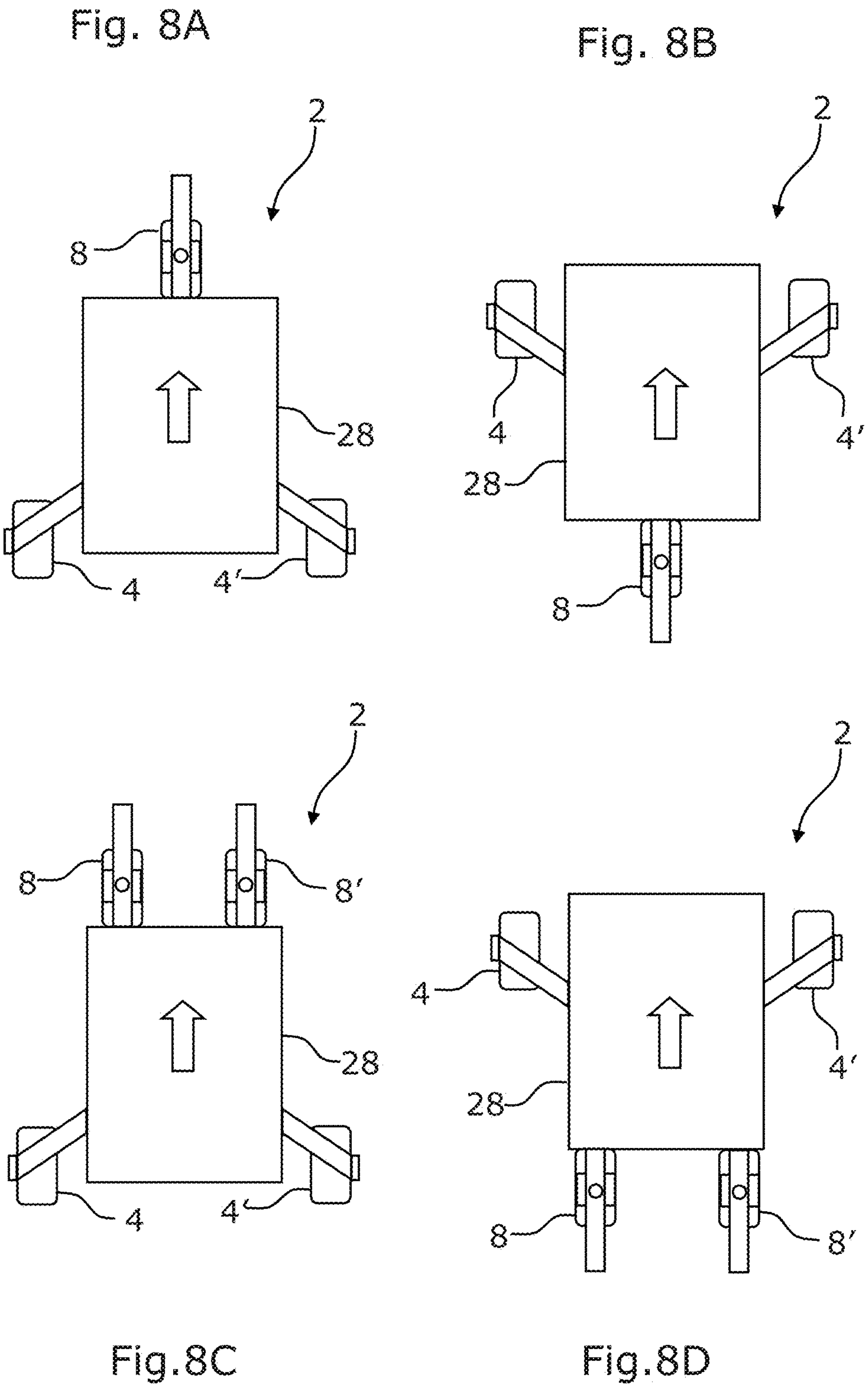
FIG. 8A shows a top view of a mobile field robot according to an embodiment.
FIG. 8B shows a top view of a mobile field robot according to an embodiment.
FIG. 8C shows a top view of a mobile field robot according to an embodiment.
FIG. 8D shows a top view of a mobile field robot according to an embodiment.

FIG. 8A illustrates a top view of a mobile field robot 2 according to an embodiment. The mobile field robot 2 comprises a frame 28 and a centrally arranged front mounted steerable wheel 8. The mobile field robot 2 comprises two driving wheels 4, 4' mounted to the side portion of the frame 28. The forward driving direction of the mobile field robot 2 is indicated with an arrow.

FIG. 8B illustrates a top view of a mobile field robot 2 according to an embodiment. The mobile field robot 2 comprises a frame 28 and a centrally arranged rear mounted steerable wheel 8. The mobile field robot 2 comprises two driving wheels 4, 4' mounted to the side portion of the frame 28. The forward driving direction of the mobile field robot 2 is indicated with an arrow.

FIG. 8C illustrates a top view of a mobile field robot 2 according to an embodiment. The mobile field robot 2 comprises a frame 28 and two front mounted steerable wheels 8, 8'. The mobile field robot 2 comprises two driving wheels 4, 4' mounted to the side portion of the frame 28. The forward driving direction of the mobile field robot 2 is indicated with an arrow.

FIG. 8D illustrates a top view of a mobile field robot 2 according to an embodiment. The mobile field robot 2 comprises a frame 28 and two rear mounted steerable wheels 8, 8'. The mobile field robot 2 comprises two driving wheels 4, 4' mounted to the side portion of the frame 28. The forward driving direction of the mobile field robot 2 is indicated with an arrow.

LIST OF REFERENCE NUMERALS

2 Mobile field robot
4, 4' Driving wheel
6 Bracket
8, 8' Steerable wheel
10 Joint assembly
12 Safety wire
14, 14' Arm

16 Solar panel
18 Wheel mount
20 Connector
22 Shaft assembly
24 Actuator
26, 26' Rod
28 Frame
30 Actuator
32 Base structure
34 Antenna
36, 36' Pulley
38 Joint structure
40 Connection structure
42 Proximal structure
44 Control box
46 Mounting structure
48 Cable
50, 50' Tool
52 Mobile field robot body
54 Bolt
56 Cutting knife
α Angle
β Angle
D Downhill side
U Uphill side
G Ground
X Axis perpendicular to the wheel axis
Y Longitudinal axis of the shaft assembly
Z Steerable wheel shaft axis
N Normal axis of the mobile field robot
g Gravity
M Mass
$F_1$, $F_2$ Vertical force
$L_1$, $L_2$ Horizontal distance
$I_1$, $I_2$ Current
$P_1$, $P_2$ Power
$B_1$, $B_2$ Load

What is claimed is:

1. A mobile field robot having a normal axis (N) and configured to drive on ground as an automated vehicle for agricultural crop production, the mobile field robot comprising:
- a frame;
- a first driving wheel that is driven by a first motor, wherein the first driving wheel is mounted to the frame;
- a second driving wheel that is driven by the first motor or a second motor, wherein the second driving wheel is mounted to the frame; and
- at least one steerable wheel mounted to a wheel mount, wherein the steerable wheel has a steerable wheel shaft axis (Z), wherein the steerable wheel is arranged and configured to be rotated such that the steerable wheel shaft axis (Z) is rotated about the normal axis (N) of the mobile field robot, wherein the mobile field robot:
- a) is configured to detect one or more input of a load of the motor(s); and
- b) comprises a joint assembly arranged and configured to change an orientation of the at least one steerable wheel on the basis of the input such that a difference between loads of the driving wheels is reduced
- wherein an actuator is fixed to a base structure that is attached to the frame or a structure that is fixed to the frame;
- wherein the wheel mount is rotatably mounted to a connector that is rotatably mounted to the base structure.

2. The mobile field robot according to claim 1 further configured to detect one or more input selected from the group consisting of slippage of one or more of the driving wheels, road grip of one or more of the driving wheels, and an inclination of the mobile field robot.

3. The mobile field robot according to claim 1, wherein the joint assembly is arranged and configured to:
- a) rotate the steerable wheel such that an angle between the ground and the steerable wheel shaft axis (Z) is changed; or
- b) rotate the steerable wheel shaft axis (Z) about the normal axis (N) of the mobile field robot such that the difference between the load of the driving wheels is reduced.

4. The mobile field robot according to claim 1, wherein the actuator is arranged and configured to rotate the steerable wheel such that an angle between the ground and the steerable wheel shaft axis (Z) is changed.

5. The mobile field robot according to claim 4, wherein the joint assembly comprises a bracket that is attached to the base structure, the connector is attached to a joint structure, and the bracket comprises two end portions that are rotatably attached to the connector.

6. The mobile field robot according to claim 5, wherein the joint structure is angled 0-45 degrees relative to the normal axis (N).

7. The mobile field robot according to claim 6, further comprising a control system configured to detect the loads of the motors of the driving wheels, wherein the control system is configured to activate the actuator when the control system detects that the difference between the load of the motor of the first driving wheel and the load of the motor of the second driving wheel exceeds a predefined level.

8. The mobile field robot according to claim 7, wherein the control system is configured to:
- a) activate the actuator in a first direction if $|B_1-B_2|\leq C_2$, where $C_2$ is a predefined level; and
- b) activate the actuator in an opposite direction if $|B_2-B_1|\leq C_3$, where $C_3$ is a predefined level;
- wherein $B_1$ and $B_2$ are load measurements from the first motor and the second motor.

9. A method for steering a mobile field robot having a normal axis (N) and configured to drive on ground as an automated vehicle for agricultural crop production, the mobile field robot comprising:
- a frame;
- a first driving wheel that is driven by a first motor, wherein the first driving wheel is mounted to the frame or to a structure connected to the frame;
- a second driving wheel that is driven by the first motor or a second motor, wherein the second driving wheel is rotatably mounted to the frame or to a structure connected to the frame; and
- at least one steerable wheel mounted to a wheel mount, wherein the steerable wheel has a steerable wheel shaft axis (Z), wherein the steerable wheel is arranged and configured to be rotated such that the steerable wheel shaft axis (Z) is rotated about the normal axis (N) of the mobile field robot,
- wherein an actuator is fixed to a base structure that is attached to the frame or a structure that is fixed to the frame;
- wherein the wheel mount is rotatably mounted to a connector that is rotatably mounted to the base structure,
- wherein the method comprises:

a) detecting one or more input of a load of the motor(s); and b) using a joint assembly changing an orientation of the one or more steerable wheels on the basis of the input such that a difference between loads of the driving wheels is reduced.

10. The method according to claim 9, further comprising detecting one or more inputs selected from the group consisting of slippage of one or more of the driving wheels, road grip of one or more of the driving wheels, and an inclination of the mobile field robot.

11. The method according to claim 9, further comprising the step of:

a) rotating the steerable wheel such that an angle between the ground and the steerable wheel shaft axis (Z) is changed; or b) rotating the steerable wheel such that the angle between the ground and the steerable wheel shaft axis (Z) is changed such that the difference between the loads of the driving wheels is reduced.

12. The method according to claim 9, further comprising the step of applying an actuator to rotate the steerable wheel such that an angle between the ground and the steerable wheel shaft axis (Z) is changed.

13. The method according to claim 12, wherein the joint assembly comprises a bracket that is attached to the base structure, the connector is attached to a joint structure, and the bracket comprises two end portions that are rotatably attached to the connector.

14. The method according to claim 13, wherein the joint structure is angled 0-45 degrees relative to the normal axis (N).

15. The method according to claim 12, further comprising the following steps:

a) detecting the load(s) of the motor(s) of the driving wheels; and b) activating the actuator if a difference between the load of the motor of the first driving wheel and the load of the motor of the second driving wheel exceeds a predefined level.

16. The method according to claim 15, further comprising the following steps:

a) activating the actuator in a first direction if $|B_1-B_2|\leq C_2$, where $C_2$ is a predefined level; and b) activating the actuator in an opposite direction if $|B_2-B_1|\leq C_3$, where $C_3$ is a predefined level;

wherein $B_1$ and $B_2$ are load measurements from the first motor and the second motor.

* * * * *